Feb. 15, 1966   E. A. LEONARD   3,235,116
CLOSURE DEVICE

Filed Sept. 24, 1963   3 Sheets-Sheet 1

INVENTOR
Edmund A. Leonard
BY
ATTORNEY

Feb. 15, 1966  E. A. LEONARD  3,235,116
CLOSURE DEVICE
Filed Sept. 24, 1963
3 Sheets-Sheet 3

INVENTOR
Edmund A. Leonard
BY
ATTORNEY

United States Patent Office 3,235,116
Patented Feb. 15, 1966

3,235,116
CLOSURE DEVICE
Edmund A. Leonard, Yonkers, N.Y., assignor to General Foods Corporation, White Plains, N.Y., a corporation of Delaware
Filed Sept. 24, 1963, Ser. No. 311,073
11 Claims. (Cl. 215—52)

This application relates generally to closure devices for sealing the opening of containers adaptable for storing a material or product adversely affected by exposure to or contact with oxygen, the invention relating more particularly to easy opening closure devices compatible for use with glass containers and effective for maintaining a seal for a product packed in a vacuum, but developing a positive interior pressure within the container during its normal storage life.

The invention is disclosed herein in an embodiment adapted for use with a glass container or carafe shaped to serve as the jar or the brew-containing vessel of a coffee percolating apparatus. The shape of the vessel or container is one providing a restricted throat defined by the apex of an angle formed by diverging side walls of the vessel. The contained product is located within the main body of the vessel below the throat, which throat is the section of the vessel having the smallest diameter, and the closure device is designed to be seated within said container in a position to form a seal in the area of said throat, thus protecting the contained product from exposure to atmosphere. In the embodiment as herein disclosed, the packed product contained within the vessel includes in addition to ground coffee the operative parts of a percolator apparatus, thereby rendering the container and its contents a unitary pack having considerable sales appeal and found to be of value as a sales promotion item in the merchandising of ground coffee products. However, it should be understood that the inclusion of the percolator apparatus within the container as herein disclosed is not to be regarded as in any way essential to the novel inventive concepts of the instant invention.

The closure device of the instant invention, briefly stated, comprises a circular diaphragm adapted to lie across the throat of said container. The peripheral edge of said diaphragm is in the form of a vertical skirt joined at its upper extremity to an upwardly and outwardly flaring flange. The outer surface of the skirt is formed with a rounded off bulge serving as an annular bead adapted for making sealing contact with the inner surface of the container walls at a point slightly below the throat of the vessel. The upwardly and outwardly flaring flange is adapted to bear upon the inner surface of the walls of the container above said throat for the principal purpose of retaining the closure device in proper seated position within the container.

The closure device is made from a material which will give the device semirigid properties, the device having sufficient resilience to return to its normal shape after being slightly deformed. The material from which that device is made is preferably a thermoplastic substance such as, for example, polyethylene or the like. The exterior dimensions of said device at its point of sealing contact are slightly greater than the interior dimensions of said container at the point of sealing contact so as to require slight deformation of the device when seated within the container in sealing position. This deformation sets up stresses within the device which act to force the sealing contact area of the device into tight sealing engagement with the walls of the container.

The closure device may be readily removed from its seated sealing engagement within the container by manually applying an upward pressure to one side of the device and a downward pressure to the diametrically opposed side of the device causing the device to pivot about a diametric axis to a tilted position. From this position it may be readily lifted from the container since when tilted the major portion of its peripheral area is relieved of the stresses of deformation causing it to assume a slightly eliptical shape under the influence of pressures thereon at diametrically opposed points of its periphery, enabling it to thus easily pass through said restricted throat of the container. The upwardly and outwardly flared flange of the device is sufficiently resilient to enable it to be progressively flexed around one half of its periphery as is occasioned by the tilting of the device in preparation for removing it from the container.

The major interior portion of the device consists of a membrane which slopes downwardly from its periphery in a generally concave fashion when viewed from above except for its central portion which rises abruptly upwardly to define a pocket or cavity for accommodating the upper end of the contained percolator pump. When the device is being installed as a seal for the container, the interior membrane is flexed inwardly to increase the degree of concavity, thereby deforming the device in a manner to create the stresses acting to force the sealing or contact surfaces in tight-sealing contact with the walls of the container. When the seal is utilized to retain the contained product under a partial vacuum, the positive atmospheric pressure acting thereon would normally tend to push the device into the interior of the container. However, this tendency is resisted by the flanged portion of the device seated above the throat of the container and having sufficient rigidity to resist the force of atmospheric pressure. As a positive interior pressure develops within the container, this pressure acting on and through the concave membrane serves to laterally force the contact areas of the device into tighter sealing engagement with the walls of the container, thereby preventing the device from being raised or unseated by the interior positive pressure.

It is therefore an object of this invention to improve upon easy opening closure devices adaptable for sealing off the restricted throat portion of a product container.

It is a further object of this invention to provide an easy opening closure device adaptable for use with a glass container and capable of maintaining a seal under conditions of both negative and positive interior pressure.

Further objects of the invention together with the features contributing thereto and the advantages accruing therefrom will be apparent from the following description when read in conjunction with the drawing wherein.

Figure 1:
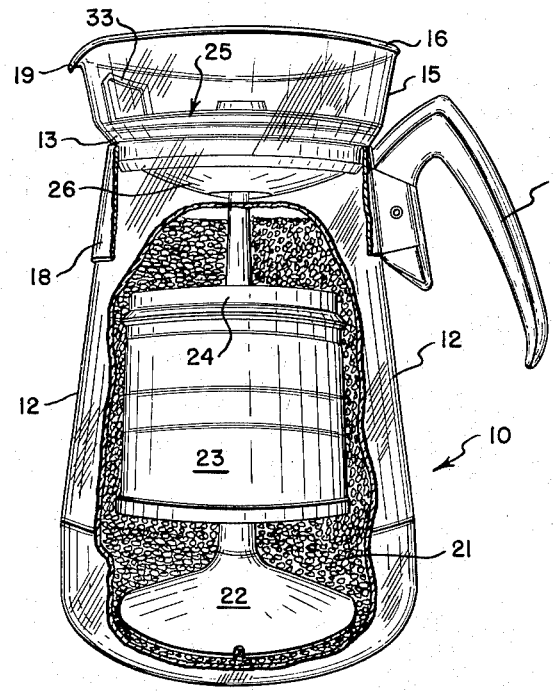
FIG. 1 is a perspective view of a container showing the closure device of the invention seated in sealing position therein.
Figure 2:
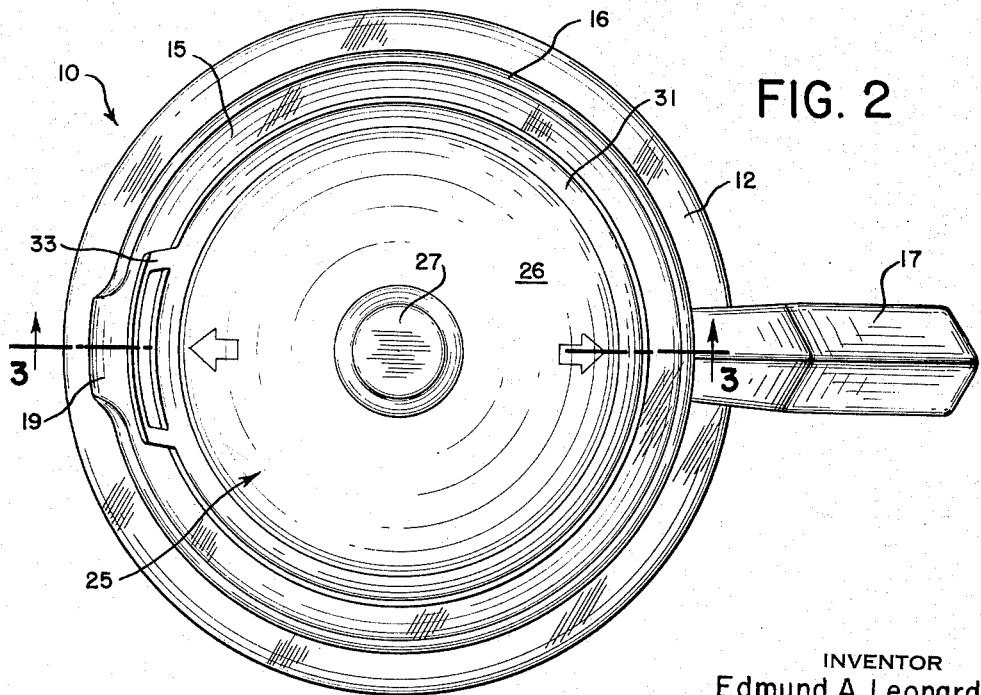
FIG. 2 is a plan view in enlarged scale of the container and closure device shown in FIG. 1.
Figure 3:
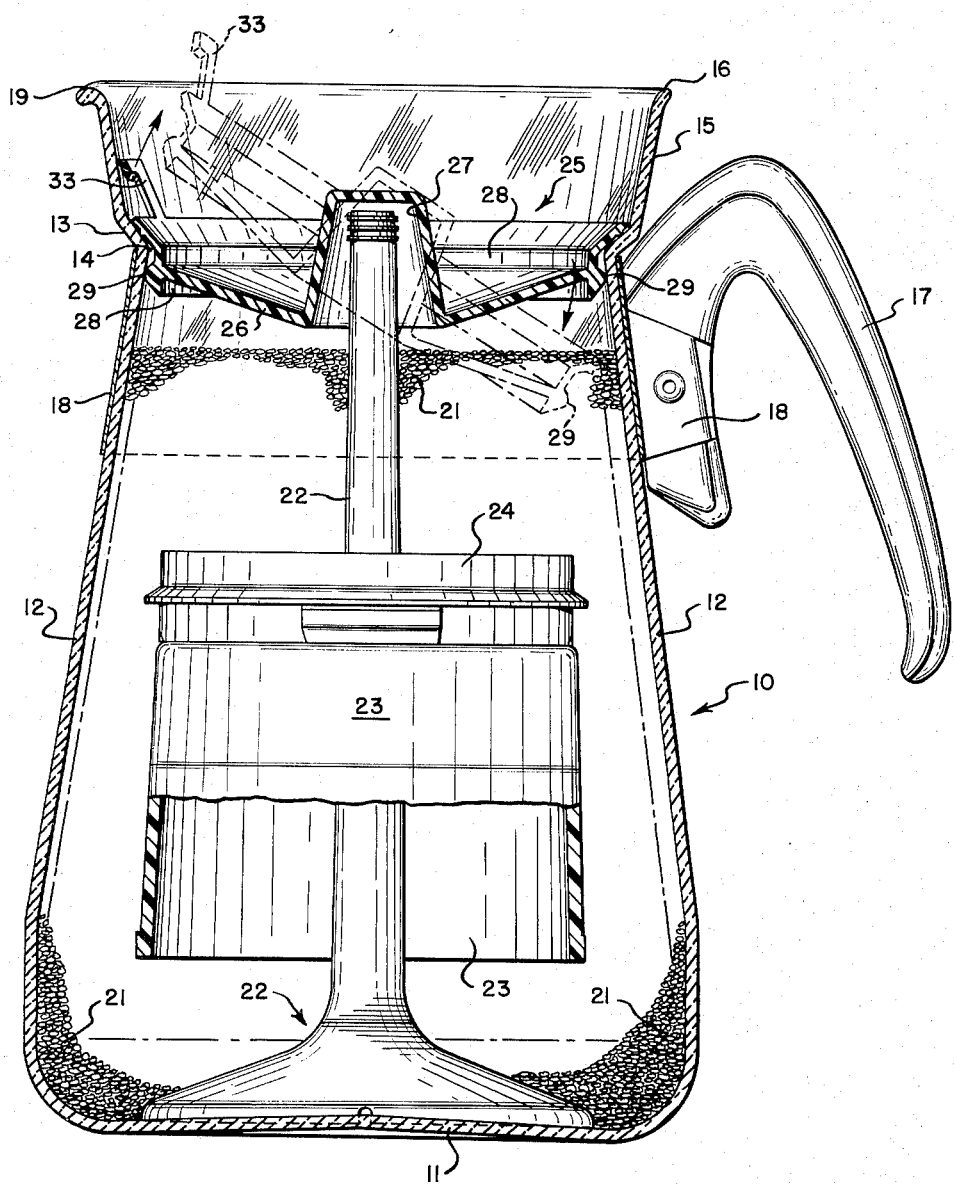
FIG. 3 is a sectional view through the container taken along the line 3—3 of FIG. 2.

As seen best in FIGS. 1 and 3 the container according to the instant embodiment of the invention comprises a glass carafe shaped to serve as the liquid-containing vessel for a percolating apparatus and having a substantially flat bottom surface 11 joined by a rounded heel portion with inwardly tapering side walls 12. The inward taper of the side walls continues to a point near the top of the container whereat the side wall flares sharply outwardly and upwardly for a short distance to define a shoulder 13. The apex of the angle formed at the junction of the inwardly tapering side walls and the outwardly flared shoulder 13 defines a restricted throat 14 for the container, said throat being the section of the vessel having the smallest diameter. From the shoulder 13 the profile of the vessel continues upwardly with a slight outward flare, less than the flare of shoulder 13, to define a collar 15 terminating in a peripheral rounded off rim 16. A handle 17 is attached to the container by means of a strap or band 18 encircling the side walls 12 at a point immediately below the throat 14, said band being attached by any suitable means, such as a rivet or the like, to the handle 17. A pouring spout 19 is provided on the opposite side of the container from the handle.

Packed within the container is a quantity of ground coffee 21 together with parts of a percolating mechanism consisting of a thermal pump 22, infuser or basket 23 and a spreader plate 24. It will of course be understood that the parts of the percolating apparatus are not shown assembled in their operative working positions but, rather, are shown as assembled for packing wherein the basket 23 is inverted from its normal operative working position on the pump stem, and the spreader plate 24 is shown resting on the opposite end of the basket from which it is normally placed when in working position.

The closure device which is molded in one piece of thermoplastic substantially noncompressible material, preferably polyethylene, comprises generally a diaphragm, the interior portion of which constitutes a membrane 26 which slopes slightly downwardly from its outer periphery to provide a generally concave surface when viewed from above except for the central area thereof which rises upwardly to define an upwardly projecting pocket or cavity 27 for accommodating and receiving the upper end of the stem portion of the pump 22.

Formed about the peripheral edge of membrane 26 is a vertically disposed skirt 28 extending above and below its point of juncture with the membrane. The outer surface of such skirt is shaped to provide a rounded off protuberance or bulge 29 which constitutes an annular bead about the periphery of the membrane, which bead at its apex is adapted to make sealing contact with the inner surface of the container walls 12 at a point slightly below the throat 14.

Flaring upwardly and outwardly from the top of the skirt 28 is a flange 31 conforming to the slope of the shoulder 13 above the container throat 14. The underside of the flange 31 is formed with a small bead 32 adapted to engage the inner surface of the shoulder 13 about its entire circumference and serving as a secondary sealing contact to supplement the sealing contact effected by the bead 29. By utilizing the curved surface of beaded portions, such as bead 29, for a point of sealing contact between the closure and the container, the area of the contacting surfaces are minimized, thereby causing the forces acting thereon to become concentrated and consequently more effective in maintaining the sealing contact.

Secured to one side of the flange 31 is a loop-shaped tab 33 for enabling grasping of the diaphragm and applying upward force thereon when it is desired to remove the closure from the container. By so doing and at the same time pushing downwardly on the diametrically opposed side, the diaphragm may be tilted about a diametric axis to the position shown in broken lines in FIG. 3. When tilted in this manner the diaphragm is deformed, from the pressures acting on its diametric pivotal axis by the throat of the container, into a slightly eliptical shape which enables it to be easily withdrawn through the container throat.

Figure 4:
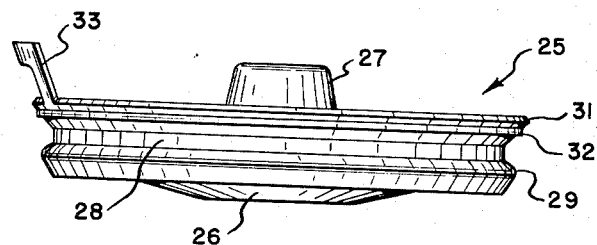
FIG. 4 is a detailed view of the closure device shown apart and separate from the container with which it is used.
Figure 5:
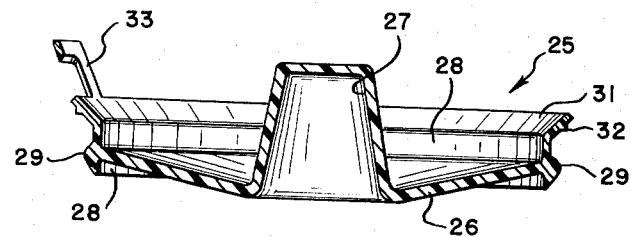
FIG. 5 is a detailed view showing the structure of FIG. 4 in section.
Figure 6:
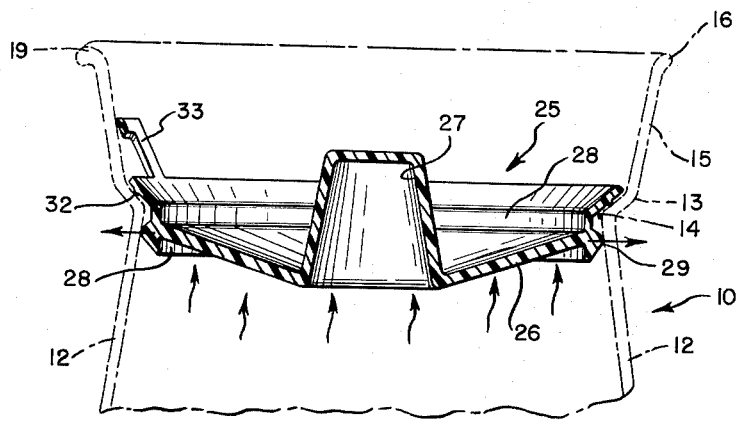
FIG. 6 is a sectional view of the closure device similar to that of FIG. 5 but illustrating the slight deformation of the device when placed in seated position across the throat of an associated container.

The material from which the diaphragm is made being a thermoplastic substantially noncompressible substance renders the device semirigid so that when deformed out of its normal shape it tends to spring back into its normal shape. FIGS. 4 and 5 illustrate the device in its normal shape wherein it will be seen that the membrane 26, over its area between the skirt 28 and the central cavity 27, is concave to a predetermined degree. In FIG. 6 which shows the device in seated position across the throat of container 25, it will be noted that the degree of concavity of the same portion of the membrane 26 has been somewhat increased to result in deformation of the device. This places the structure under stress and creates forces acting laterally through the membrane and the peripheral bead 29 which tend to force the bead into tight sealing engagement with the walls 12 of the container. The deformed condition of the membrane as shown in FIG. 6 results from the fact that the outer diameter of the bead 29 is slightly greater than the interior diameter of the container walls at the point where sealing contact is made. Thus, as long as the diaphragm remains in seated position it will be held in a somewhat deformed state by the reduced dimensions of the container walls at the point of bearing contact, thereby causing force to be continually applied to the sealing contact surfaces.

Insertion of the diaphragm into seated position within the container is facilitated by the fact that the outer diameter of the bottom edge of skirt 28 is slightly less than the interior diameter of the throat 14. As a result the rounded off surface of the bead 29 between its apex and the bottom edge of the skirt serves as a camming surface cooperating with interior surface of the throat to yieldably compress the peripheral surface of the diaphragm 26 to deform same as downward pressure is applied around the device to seat it in its effective sealing position. Upon reaching its proper seated position, flange 31 bears upon shoulder 13 to prevent the device from being inserted too far into the container. The flange 31 when seated on the container shoulder 13 also resists the tendency of a positive atmospheric pressure to push the closure device further into the interior of the container whenever a partial vacuum exists therein. At such time as a positive interior pressure may develop within the container, such as occurs in packages of ground coffee, said interior positive pressure thrusts upwardly, in the direction of the arrows as indicated in FIG. 6, tending to flex the membrane 26 back to its normal undeformed state. Thus, the upward force or thrust upon the membrane by the positive internal pressure is transmitted through the membrane so as to exert a lateral or horizontal force through the surface of the annular bead 29 against the side walls 12 of the container. Since the point of sealing contact between the bead 29 and the container is below the container throat and at a point from which the side walls of the container taper inwardly to said throat, upward dislodgment of the closure device is prevented. The device becomes in effect jammed in sealing position with the forces tending to unseat the device being countered by the laterally directed forces transmitted through the membrane to increase the contact pressure between the bead 29 and the walls of the container.

From the foregoing it will be evident that the closure device represented by the diaphragm 25 constitutes a highly useful closure of the easy opening type which is effective under varying conditions of positive and negative internal pressure in maintaining a seal for the associated container. It should be understood that while the device in the embodiment herein disclosed is provided with a cavity 27 to accommodate the percolator pump member, in other applications not concerned with the enclosure of a percolator pump or equivalent member the cavity may be eliminated, to render the membrane 26 a continuous concave surface, without in any way impairing the usefulness of the device.

Although there has been shown and described herein what is regarded as a preferred embodiment of the invention, it should of course be understood that obvious changes in form and/or material could be made in the device without departing from the spirit of the invention, and it is therefore intended that the invention be not limited to the exact form herein shown and described nor to anything less than the whole of the invention as hereinafter claimed.

What I claim and desire to secure by Letters Patent is:

1. A closure device for use with a container having a restricted throat defined by the apex of the angle of divergence between inwardly tapering side walls and an outwardly flaring shoulder of said container, said device comprising, a diaphragm disposed across the throat area of said container, said diaphragm including a centrally disposed membrane joined around its periphery to a vertically oriented skirt, said skirt being formed with an outwardly projecting and rounded-off bead extending below the junction between said membrane and said skirt the apex of which bead is adapted to engage in sealing contact with the walls of said container over an area below said throat, said device being formed of substantially noncompressible material giving the device semi-rigid properties and a resilience tending to return it to its normal shape when deformed within its elastic limit, said membrane being deformed when in seated position so as to exert a resilient force against the walls of said container over said area of sealing contact.

2. The invention according to claim 1 wherein the material from which said diaphragm is formed is a thermoplastic substance.

3. The invention according to claim 1 wherein said membrane slopes downwardly from its perimeter to present a concave configuration relative to said throat when the diaphragm is deformed and in sealing engagement with said container, said membrane being responsive to a positive pressure within said container for forcing to a corresponding extent said bead into sealing contact against the walls of said container.

4. The invention according to claim 1 wherein said membrane presents a concave configuration relative to the plane of said bead when said diaphragm is in a normal undeformed condition, said membrane being flexed into a greater degree of concavity when said diaphragm is deformed and in sealing engagement with said container, said membrane being responsive to a positive pressure within said container for forcing to a corresponding extent said bead into sealing contact against the walls of said container.

5. The invention according to claim 1 wherein said diaphragm and the throat area of said container are circular, the diameter of the bottom edge of said skirt being less than the diameter of said throat, the diameter of said bead at its apex being greater than the diameter of said throat, the surface area of said bead between its apex and the bottom edge of said skirt serving as a camming surface in cooperation with said throat for deforming said diaphragm as said bead is inserted through said throat into sealing engagement with the walls of said container.

6. A closure device for use with a container having a restricted throat defined by the apex of the angle of divergence between inwardly tapering side walls and an outwardly flaring shoulder of said container, said device comprising, a diaphragm disposed across the throat area of said container, said diaphragm including a centrally disposed membrane joined around its periphery to a vertically oriented skirt, said skirt being formed with an outwardly projecting and rounded-off bead extending below the junction between said membrane and said skirt the apex of which bead is adapted to engage in sealing contact with the walls of said container over an area below said throat, and an upwardly and outwardly flaring flange extending from the upper edge of said skirt, said flange being adapted to seat on said shoulder for retaining said diaphragm in sealing engagement with said container, said device being formed of substantially noncompressible material giving the device semi-rigid properties and a resilience tending to return it to its normal shape when deformed within its elastic limit, said membrane being deformed when in seated position so as to exert a resilient force against the walls of said container over said area of sealing contact.

7. The invention according to claim 6 wherein the material of which said diaphragm is formed is a thermoplastic substance.

8. The invention according to claim 6 wherein said flange is formed with a bead extending about its undersurface for making sealing contact with said shoulder.

9. The invention according to claim 6 wherein said diaphragm is sufficiently resilient as to be pivotable about a diametric axis to a tilted position relative to its position of sealing contact with said container upon application of manually applied inward force on one segment of its periphery and manually applied outward force on a diametrically opposed segment of its periphery for enabling the removal of said diaphragm from said container, and including a tab member joined to said flange for facilitating the manual application of said outward force.

10. The invention according to claim 6 wherein said membrane slopes downwardly from its perimeter to present a concave configuration relative to said throat when said diaphragm is deformed and in sealing engagement with said container, said membrane being responsive to a positive pressure within said container for forcing to a corresponding extent said bead into sealing contact against the walls of said container.

11. The invention according to claim 6 wherein said membrane presents a concave configuration relative to the plane of said bead when the diaphragm is in a normal undeformed condition, said membrane being flexed into a greater degree of concavity when the diaphragm is deformed and in sealing engagement with said container, said membrane being responsive to a positive pressure within said container for forcing to a corresponding extent said bead into sealing contact against the walls of said container.

References Cited by the Examiner

UNITED STATES PATENTS

| | | | |
|---|---|---|---|
| 2,024,532 | 12/1935 | Mancuso | 215—47 |
| 2,372,181 | 3/1945 | Barr | 215—47 X |
| 2,808,957 | 10/1957 | Bradley | 215—52 X |
| 3,068,777 | 12/1962 | Pedalino | 99—312 X |

FOREIGN PATENTS

| | | |
|---|---|---|
| 1,047,110 | 12/1958 | Germany. |
| 661,829 | 11/1951 | Great Britain. |

FRANKLIN T. GARRETT, *Primary Examiner.*